US012640323B1

(12) United States Patent
Marshall et al.

(10) Patent No.: US 12,640,323 B1
(45) Date of Patent: May 26, 2026

(54) APPARATUS AND METHOD FOR FAST VACUUM SWITCH LINK

(71) Applicant: Smart Wires Inc., Durham, NC (US)

(72) Inventors: Trevor B. Marshall, Nottingham (GB); Michael J. Saunders, Hucknall (GB)

(73) Assignee: Smart Wires Inc., Durham, NC (US)

( * ) Notice: Subject to any disclaimer, the term of this patent is extended or adjusted under 35 U.S.C. 154(b) by 258 days.

(21) Appl. No.: 18/338,210

(22) Filed: Jun. 20, 2023

Related U.S. Application Data

(60) Provisional application No. 63/355,496, filed on Jun. 24, 2022.

(51) Int. Cl.
*H01H 71/24* (2006.01)

(52) U.S. Cl.
CPC ............................... *H01H 71/2463* (2013.01)

(58) Field of Classification Search
CPC .. H01H 71/2463; H01H 33/42; H01H 33/666; H01H 33/6662; H01H 2033/66253; H01H 2033/6667; H01H 50/16
USPC ......... 218/141, 142, 140, 120, 118; 335/154
See application file for complete search history.

(56) References Cited

U.S. PATENT DOCUMENTS 7,215,228 B2 * 5/2007 Rhein ................ H01H 33/6662 335/197
9,837,229 B2 * 12/2017 Chaly .................. H01H 47/325
10,553,372 B2 * 2/2020 Gentsch ........... H01H 33/66238
10,784,064 B2 * 9/2020 Kowalyshen ...... H01H 33/6662
10,825,625 B1 * 11/2020 Marshall ............ H01H 33/6662
10,923,298 B1 * 2/2021 Chen .................. H01H 33/6662
10,923,304 B1 * 2/2021 Juds ....................... H01H 51/01
11,227,729 B1 * 1/2022 Rakus ..................... F16F 9/535
2012/0274428 A1 * 11/2012 Reuber .............. H01H 33/6662 335/6
2015/0371748 A1 * 12/2015 Kim .......................... H01F 7/18 361/206
2020/0328054 A1 * 10/2020 Hanna .................... H01H 50/14
2020/0402752 A1 12/2020 Leccia et al.
2020/0411262 A1 * 12/2020 Zhou .................... H01H 50/443
2022/0044894 A1 * 2/2022 Nault ....................... H02B 5/02
2022/0076910 A1 * 3/2022 Stoving ................ G01R 15/181

* cited by examiner

*Primary Examiner* — William A Bolton

(74) *Attorney, Agent, or Firm* — Womble Bond Dickinson (US) LLP

(57) ABSTRACT

An apparatus and methods of opening and closing a vacuum switched link are disclosed. The apparatus includes a vacuum interrupter including a mechanical coupling and a moving contact. The apparatus further includes a drive rod, where the mechanical coupling is disposed between the drive rod and the moving contact. The apparatus further includes a direct-acting closing spring coupled to the drive rod. The apparatus further includes a reset spring coupled to the drive rod. The apparatus further includes an armature slidably coupled to the drive rod and responsive to the reset spring during closing of the vacuum interrupter. The apparatus further includes a coil embedded in the armature.

16 Claims, 8 Drawing Sheets

APPARATUS AND METHOD FOR FAST VACUUM SWITCH LINK

CROSS-REFERENCE TO RELATED APPLICATIONS

This application claims the benefit of U.S. Provisional Application No. 63/355,496 filed on Jun. 24, 2022, the disclosure of which is incorporated herein by reference.

TECHNICAL FIELD

Embodiments of the application relate to vacuum interrupters (VIs). More specifically, embodiments of the application relate to a fast acting vacuum switched link (VSL).

BACKGROUND

A fault current in a power transmission line can damage sensitive electronics in a power flow control system. Circuits, such as metal oxide varistors (MOVs) and silicon-controlled rectifiers (SCRs), can be used to divert fault currents away from the sensitive electronics. These devices are most effective for short duration faults. However, if the fault lasts too long, they will burn up. For long duration faults (such as a tree limb falling across the lines), a grid operator typically activates circuit breakers to disconnect the fault section from the grid. A vacuum interrupter (VI) can provide protection of the sensitive electronics for faults of intermediate or long duration, potentially caused by load changes or capacitive bank operations. If a VSL incorporating a VI is fast acting, it can adequately protect the electronic circuits until the circuit breakers are activated, thereby avoiding downtime and potentially costly repair of the power flow control system.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
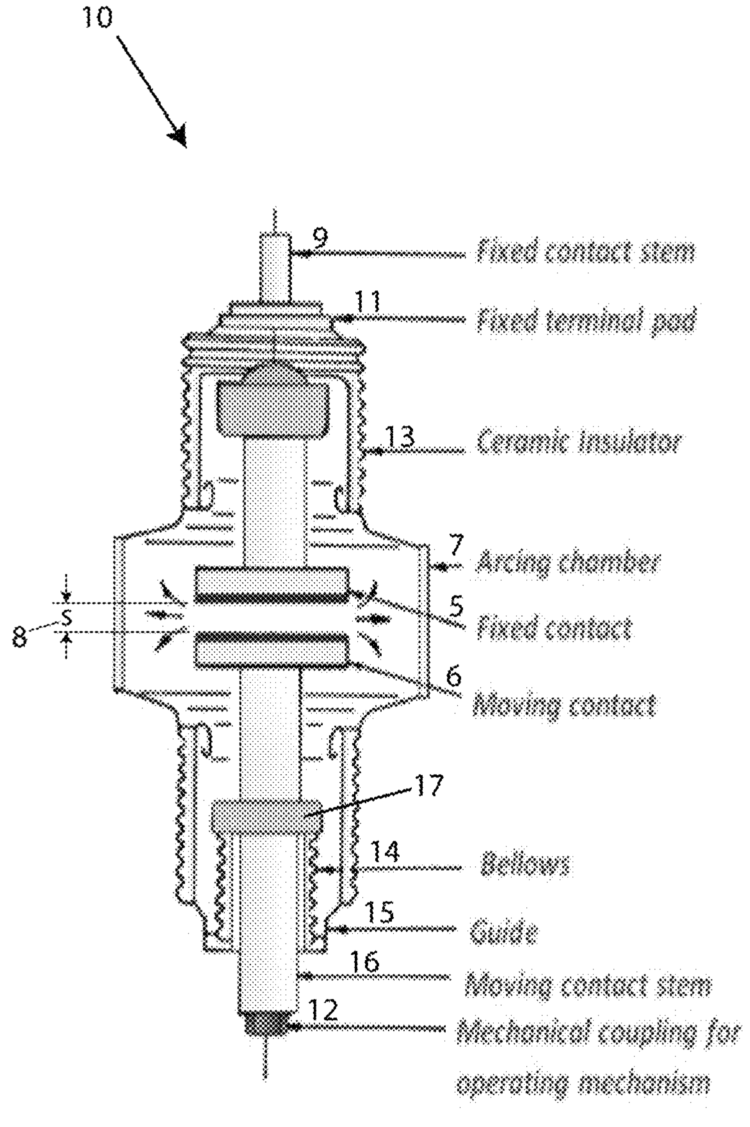
FIG. 1 illustrates a vacuum interrupter according to an embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a vacuum switch link (VSL) includes, but not limited to, an electrical switch in the form of a vacuum interrupter that is opened and closed by an actuator having a drive rod, wherein force elements coupled to the drive rod include a direct-acting closing spring, a reset spring, an armature, a coil embedded in the armature, shock absorbers, and an anti-rotation disk. The VSL may be connected into a power transmission line to divert fault currents and transient line currents away from other protective circuits such as metal oxide varistors (MOVs) and silicon-controlled rectifiers (SCRs). The VSL also protects other electronic circuits, including insulated gate bipolar transistors (IGBTs) that may be used to inject a reactive impedance into the power transmission line.

According to one aspect, an apparatus such as a vacuum switched link (VSL) is provided. The apparatus includes a vacuum interrupter including a mechanical coupling and a moving contact. The apparatus further includes a drive rod, where the mechanical coupling is disposed between the drive rod and the moving contact. The apparatus further includes a direct-acting closing spring coupled to the drive rod. The apparatus further includes a reset spring coupled to the drive rod. The apparatus further includes an armature slidably coupled to the drive rod and responsive to the reset spring during closing of the vacuum interrupter. The apparatus further includes a coil embedded in the armature.

According to another aspect, a method of opening a vacuum switched link having a vacuum interrupter, a drive rod, a direct-acting closing spring, a reset spring, and an armature having a coil embedded therein is provided. The vacuum interrupter includes a moving contact coupled to the drive rod. The drive rod is further coupled to the direct-acting closing spring and the reset spring. The armature is slidably coupled to the drive rod. The method includes applying a pulse of current to the coil to open the vacuum interrupter. The pulse of current applied to the coil generates an attractive magnetic force between the armature and an armature base plate that overcomes closing forces applied by the direct-acting closing spring and the reset spring. The method further includes applying a holding current to the coil. The method further includes applying a constant resultant force to the drive rod. The constant resultant force includes the closing forces exerted by the direct-acting closing spring and the reset spring, and a dominant opening force exerted by the armature due to the holding current applied to the coil.

According to yet another aspect, a method of closing a vacuum switched link having a vacuum interrupter, a drive rod, a direct-acting closing spring, a reset spring, and an armature having a coil embedded therein is provided. The vacuum interrupter includes a moving contact coupled to the drive rod. The drive rod is further coupled to the direct-acting closing spring and the reset spring. The armature is slidably coupled to the drive rod. The method includes quenching a holding current flowing in the coil. The method further includes allowing unrestricted acceleration of the armature for a reset distance, driven by the reset spring, to accelerate closure of the vacuum interrupter. The method further includes applying forces to the drive rod including a closing force exerted by the direct-acting closing spring and another closing force exerted by the reset spring.

Other aspects and embodiments will become apparent from the following detailed description taken in conjunction with the accompanying drawings which illustrate, by way of examples, the principles of the described embodiments.

FIG. 1 illustrates a vacuum interrupter according to an embodiment. Referring to FIG. 1, a vacuum interrupter (VI) 10 includes, but not limited to, a fixed contact 5, a moving contact 6, an arcing chamber 7, a fixed contact stem 9, a moving contact stem 16, a fixed terminal pad 11, a mechanical coupling 12, a ceramic insulator 13, a bellows 14, a guide 15, and a collar 17.

In an embodiment, fixed contact 5 and moving contact 6 are disposed in arcing chamber 7 in which air is evacuated. The VI 10 may be closed or open. When the VI 10 is in an open state, fixed contact 5 and moving contact 6 are spaced apart by a separation distance 8. Fixed contact 5 may be rigidly attached to fixed contact stem 9. Moving contact 6 may be rigidly attached to moving contact stem 16. The fixed terminal pad 11 may connect with the fixed contact stem 9. In an embodiment, mechanical coupling 12 may be attached to an operating mechanism (e.g., actuator). As shown, a vacuum enclosure of the VI 10 includes ceramic insulator 13, bellows 14, and guide 15. The top of the bellows 14 may be sealed to the collar 17 which may be sealed to moving contact stem 16. Thus, bellows 14 may be mechanically coupled to moving contact stem 16. The bottom of bellows 14 may be sealed to the outer jacket of the VI 10 above the guide 15. This configuration allows the VI stem assembly to move in a vertical direction while maintaining vacuum in the chamber. In an embodiment, the contacting surfaces of the fixed contact 5 and the moving contact 6 may include an alloy of 50% chromium and 50% copper, as an example. In an embodiment, the bellows 14 may include a thin-walled metal structure. In an embodiment, the separation distance 8 may be within a range of 4-8 millimeters (mm).

Figure 2:
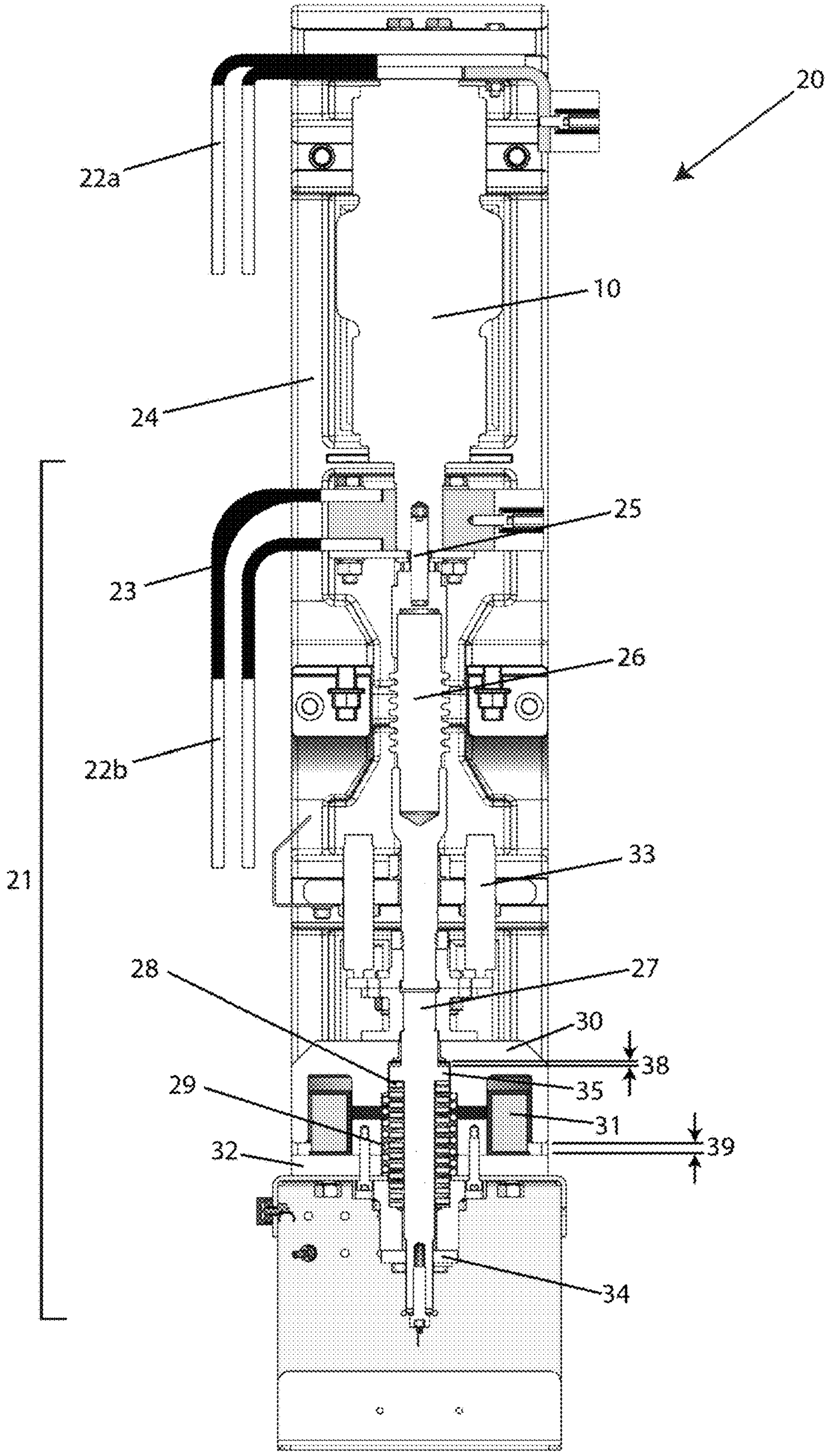
FIG. 2 illustrates an example vacuum switch link where a vacuum interrupter is in its closed position according to an embodiment.

FIG. 2 illustrates an example vacuum switch link where a vacuum interrupter is in its closed position according to an embodiment. Referring to FIG. 2, a vacuum switch link (VSL) 20 may include VI 10 and an actuator 21, with the VI 10 being in a closed position. In this embodiment, the actuator 21 is not energized. It may represent the state of the VI required for responding to a fault current, where a closed path through the VI switch is part of a bypass circuit/operation (not shown) for diverting the fault current away from sensitive electronics. When the actuator 21 is not energized, a travel gap or distance 39 may exist between armature 30 and armature base 32 included in VSL 20. The VSL 20 may further include input/output connections **22*a* and 22*b* that are constructed for high rated current, for example within the range of 1,800-4800 amperes, distributed across all the input/output connections. The peak making current for the VI 10 may be in a range of 150-170 kiloamperes, for example. Input/output connections 22*a* and 22*b* may also be constructed for high rated voltage, for example within a range of 5-10 kilovolts AC, and within a range of 15-25 kilovolts for a power frequency voltage. Each input/output connection may be provided with a conductive portion 23 that includes a flexible multi-laminate copper foil, to relieve mechanical stress in these connections when they move, or when they are subjected to vibration, or when their temperature changes. A frame 24 of VSL 20** may include a glass reinforced plastic (GRP).

Actuator 21 may include a threaded coupling member 25 for connecting with the mechanical coupling 12 of the VI 10, a drive rod having an insulated portion 26 and an actuator shaft portion 27 (which may be of stainless steel or other suitable materials for use). In an embodiment, closing spring 28 may be a strong spring, having a rectangular cross section. The travel of the direct-acting closing spring 28 may be the same as the closing distance of the vacuum interrupter 10, shown as separation distance 8 in FIG. 1. As shown, closing spring 28 and reset spring 29 may act to close the VI 10. In an embodiment, the closing spring 28 can produce a contact load between the fixed contact 5 and the moving contact 6 in a range of 6,000-10,000 newtons, for example, capable of withstanding dynamic forces associated with a fault current. In an embodiment, armature 30 may include a coil 31 (e.g., coil 31 may be embedded in the armature 30). In FIG. 2 the armature 30 is positioned for the case of a closed VI (actuator in the de-energized holding position). The armature 30 is used to open the VI 10 by applying an attractive magnetic force between the armature 30 and the armature base plate 32. The attractive magnetic force is created by applying current in coil 31. In an embodiment, the travel of the reset spring 29 may be the same as the travel of the armature 30 with respect to the drive rod.

In an embodiment, a reset gap 38 may exist between a face on the inside of armature 30 and shoulder 35 on actuator shaft 27. Initial movement of the armature 30 downwards takes up the reset gap 38 (e.g., by compressing the reset spring 29) before engaging with shoulder 35 on actuator shaft 27. At the same time travel gap 39 may decrease. Further travel of the armature 30 downwards can drive the shoulder 35 and actuator shaft 27 to open the VI 10 until travel stops when the gap 39 between armature 30 and armature base plate 32 is reduced to zero.

In an embodiment, VSL 20 may further include hydraulic shock absorbers 33 and an anti-rotation disc 34. Hydraulic shock absorbers 33 can be used to retard or reduce the closing speed of the VI 10 and reduce contact bounce. Anti-rotation disc 34 may be coupled to the actuator shaft 27 and capable of withstanding or reducing the effect of a torque generated during a linear expansion or contraction of the closing spring 28 and the reset spring 29. Using this feature and utilizing the strengths of closing spring 28 and reset spring 29, the VI 10 can operate with a fast closing time in a range of 18-22 milliseconds and an opening time in a range of 5-25 milliseconds, as an example.

Figure 3:
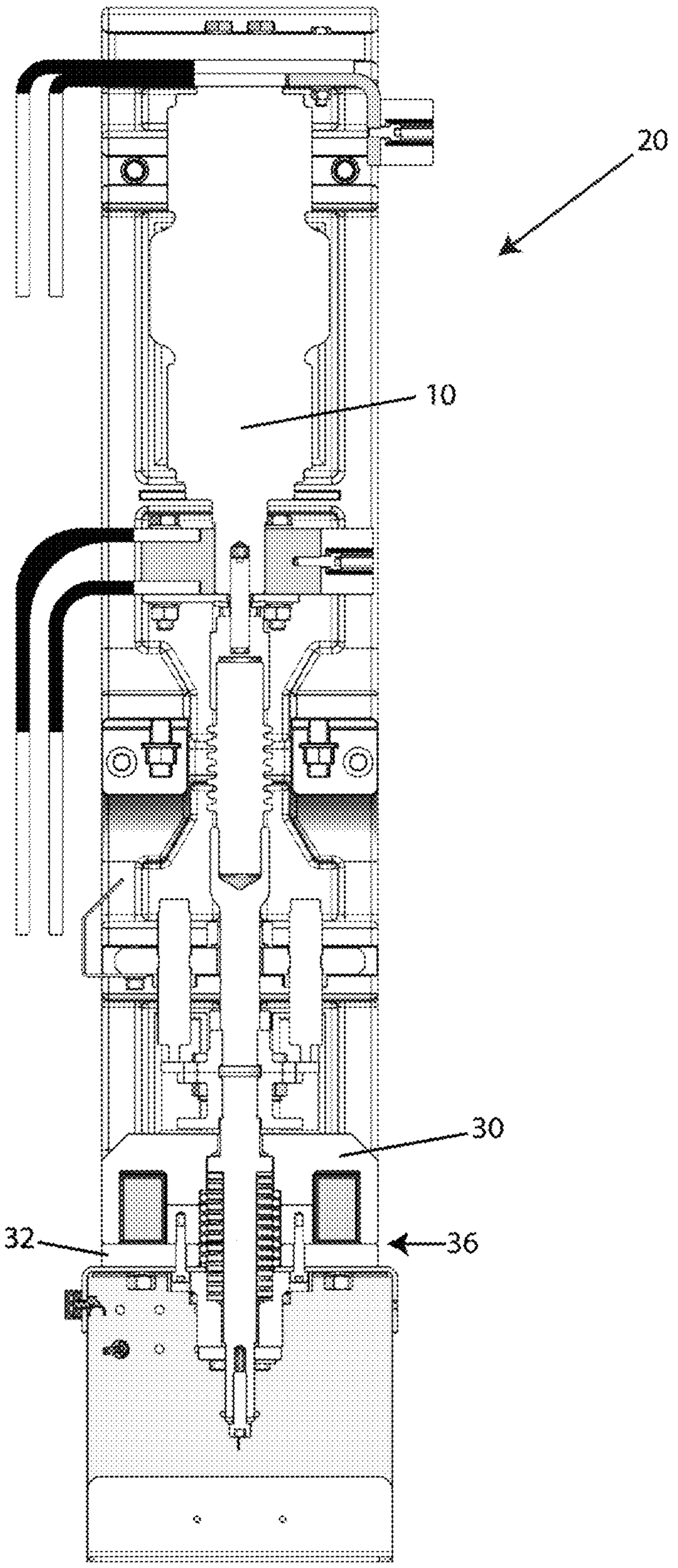
FIG. 3 illustrates the vacuum switch link where the vacuum interrupter is in its open position according to an embodiment.

FIG. 3 illustrates the vacuum switch link where the vacuum interrupter is in its open position according to an embodiment. In FIG. 3, an open VI 10 is in the VSL 20. In this embodiment, the actuator 21 is energized. It may represent the state of VSL 20 required for normal operation, where diverting a fault current through a bypass circuit is not necessary or desirable. For energizing actuator 21, delivery of power to the VSL 20 is required, for example, to energize coil 31. As a safety measure, when power to the VSL 20 is lost, the VI 10 may close and enable a bypass operation. When the actuator 21 is energized, the reset gap 38 and travel gap 39 of FIG. 2 are closed and armature 30 is in direct contact with armature base plate 32, as indicated by contact 36.

Figure 4:
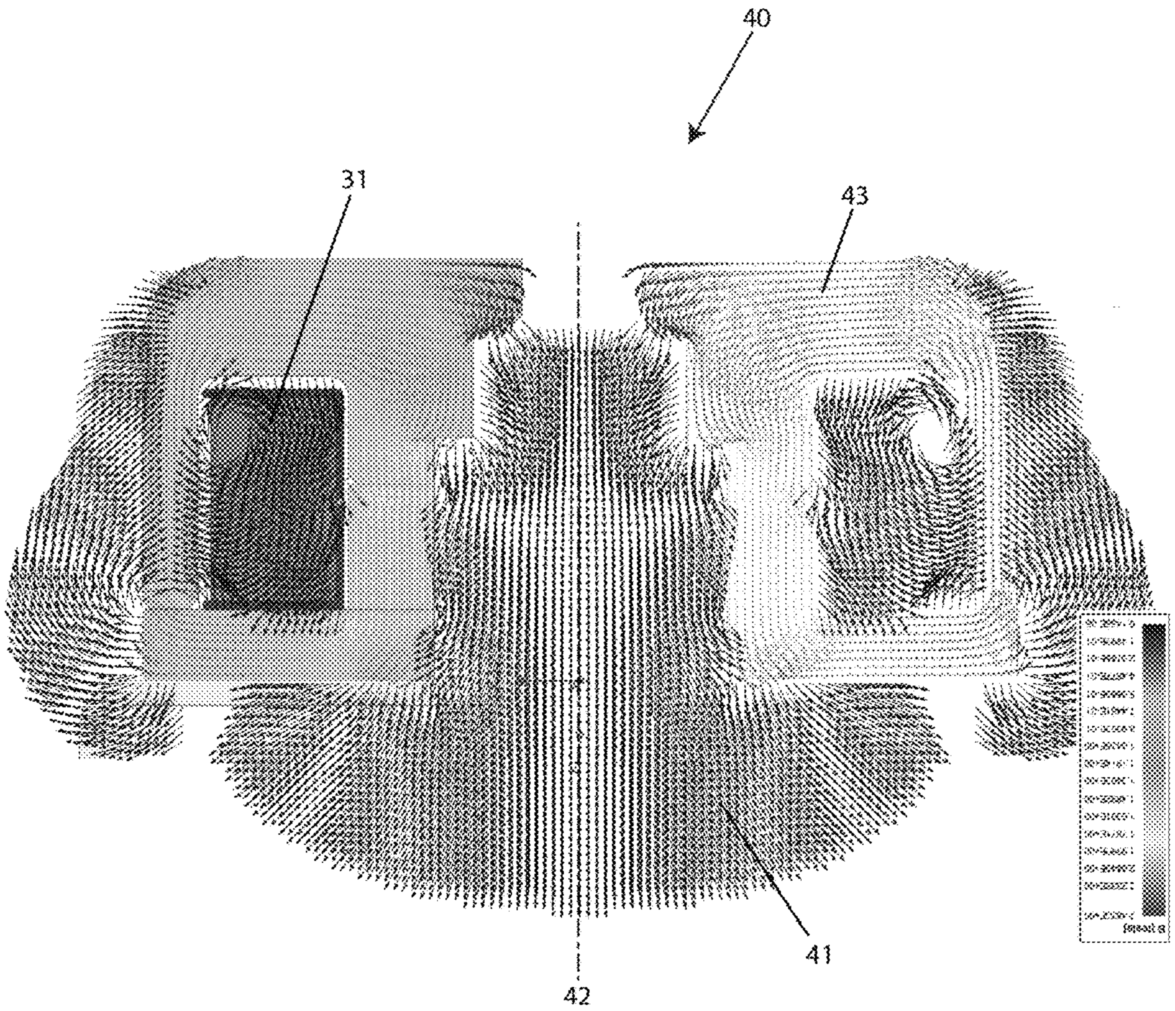
FIG. 4 illustrates a magnetic field around an armature according to an embodiment.

FIG. 4 illustrates a magnetic field around an armature according to an embodiment. In FIG. 4, a magnetic field 41 surrounds the armature 30 while a holding current is applied to coil 31. As shown, magnetic loops on each side of a centerline 42 are completed via magnetic flux 43 flowing through the armature base 32. This magnetic interaction produces a force between the armature 30 and the armature base plate 32, sufficient to overcome the closing force of closing spring 28 and reset spring 29, and also sufficient to close the reset gap 38 and travel gap 39.

In some embodiments, it is critical to close the VI 10 as quickly as possible, to limit damage to sensitive electronics. The closing time (e.g., 18-22 milliseconds) is short in part because of the substantial force applied by the closing spring 28 and the reset spring 29 acting together. In addition, the drive shaft 27 is slidably coupled to the armature 30. When the actuator 21 is de-energized, this slidable coupling allows the reset spring 29 to accelerate the drive shaft 27 upward, thereby opening the reset gap 38 and travel gap 39, and reducing the time required to close the VI 10.

Figure 5:
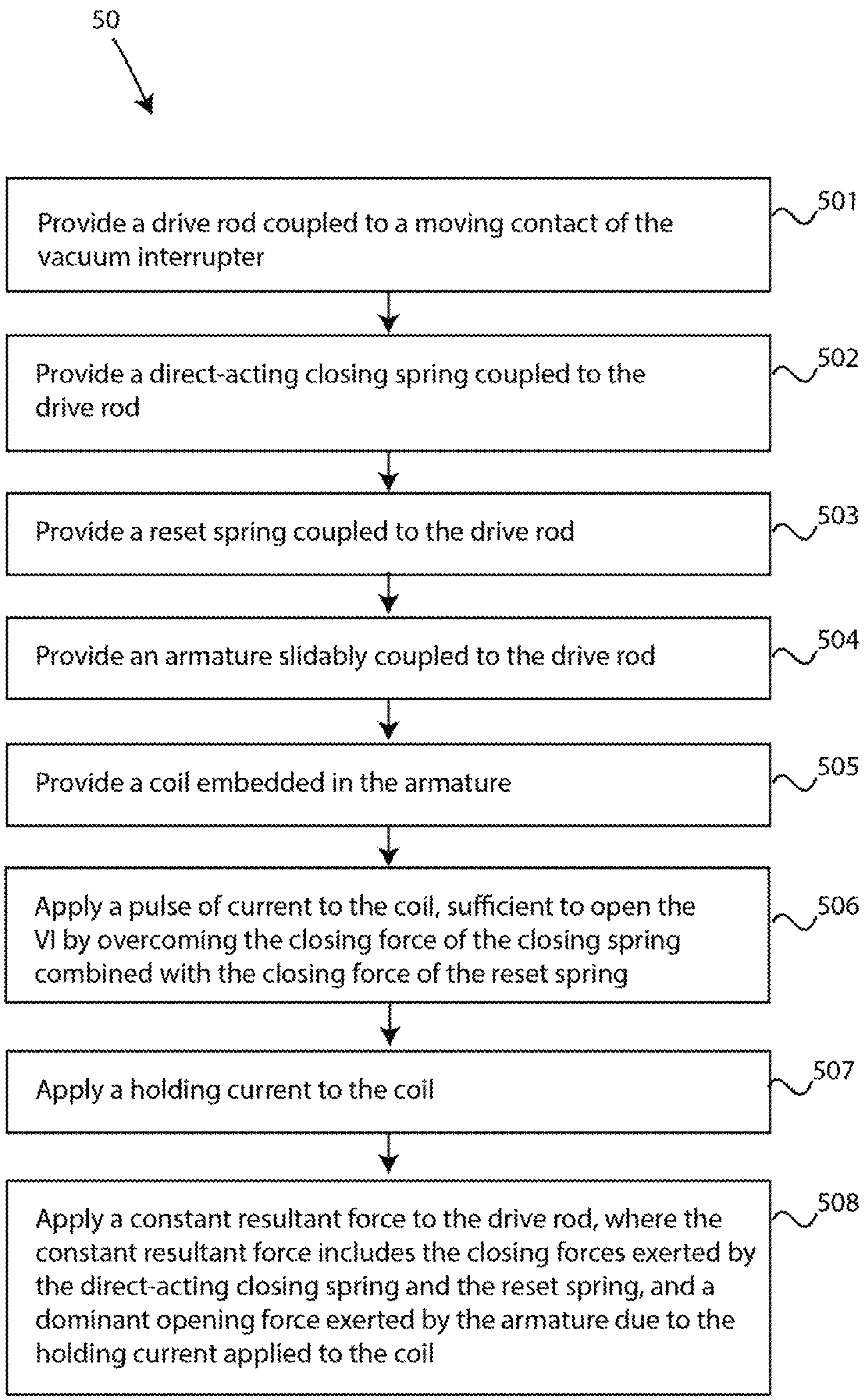
FIG. 5 is a flow diagram illustrating a process of opening a vacuum switched link and maintaining a vacuum interrupter in an open position according to an embodiment.

FIG. 5 is a flow diagram illustrating a process of opening a vacuum switched link and maintaining a vacuum interrupter in an open position according to an embodiment. In some embodiments, process 50 may be performed by VSL 20 of FIGS. 2 and 3. Referring to FIG. 5, at block 501, a drive rod coupled to a moving contact of the vacuum interrupter is provided. At block 502, a direct-acting closing spring coupled to the drive rod is provided. At block 503, a reset spring coupled to the drive rod is provided. At block 504, an armature slidably coupled to the drive rod is provided. At block 505, a coil embedded in the armature is provided. At block 506, a pulse of current is applied to the coil, sufficient to open the VI by overcoming the closing force of the closing spring combined with the closing force of the reset spring. At block 507, a holding current is applied to the coil. At block 508, a constant resultant force is applied to the drive rod including a closing force provided by the combination of the direct-acting closing spring and the reset spring, and a dominant opening force exerted by the armature due to the holding current applied to the coil.

Figure 6:
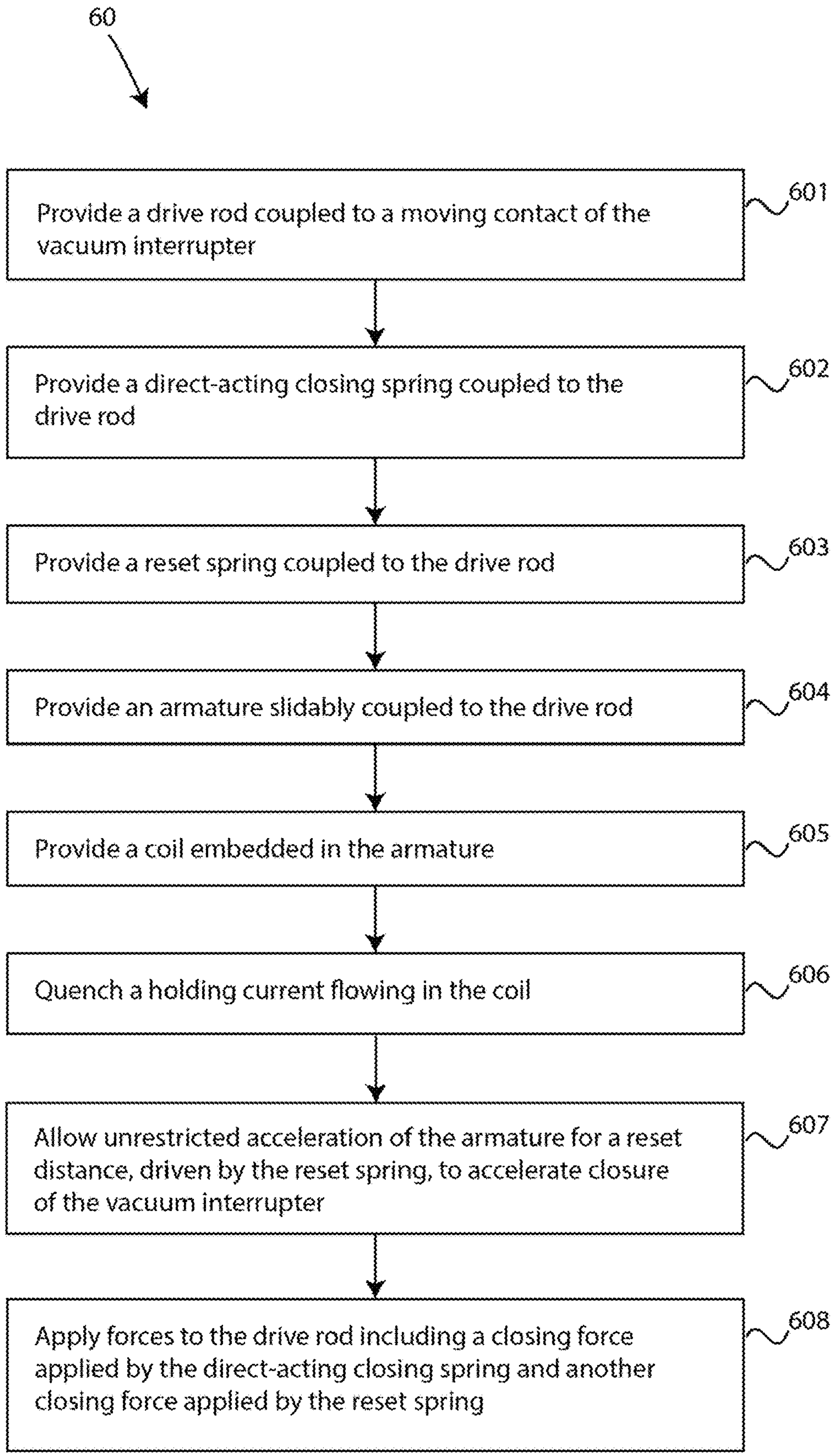
FIG. 6 is a flow diagram illustrating a process of closing a vacuum switched link according to an embodiment.

FIG. 6 is a flow diagram illustrating a process of closing the vacuum switched link according to an embodiment. In some embodiments, process 60 may be performed by VSL 20 of FIGS. 2 and 3. Referring to FIG. 6, at block 601, a drive rod coupled to a moving contact of the vacuum interrupter is provided. At block 602, a direct-acting closing spring coupled to the drive rod is provided. At block 603, a reset spring coupled to the drive rod is provided. At block 604, an armature slidably coupled to the drive rod is provided. At block 605, a coil embedded in the armature is provided. At block 606, a holding current flowing in the coil is quenched. At block 607, closure of the VI is accelerated by allowing unrestricted acceleration of the armature for a reset distance, driven by the reset spring. At block 608, forces to the drive rod are applied including a closing force applied by the direct-acting closing spring and another closing force applied by the reset spring.

As the closing spring 28 and the reset spring 29 act to linearly accelerate the drive shaft 27 they can also act to impart an undesirable rotation of the drive shaft. This undesirable rotation can be mitigated using anti-rotation ring 34.

Figure 7:
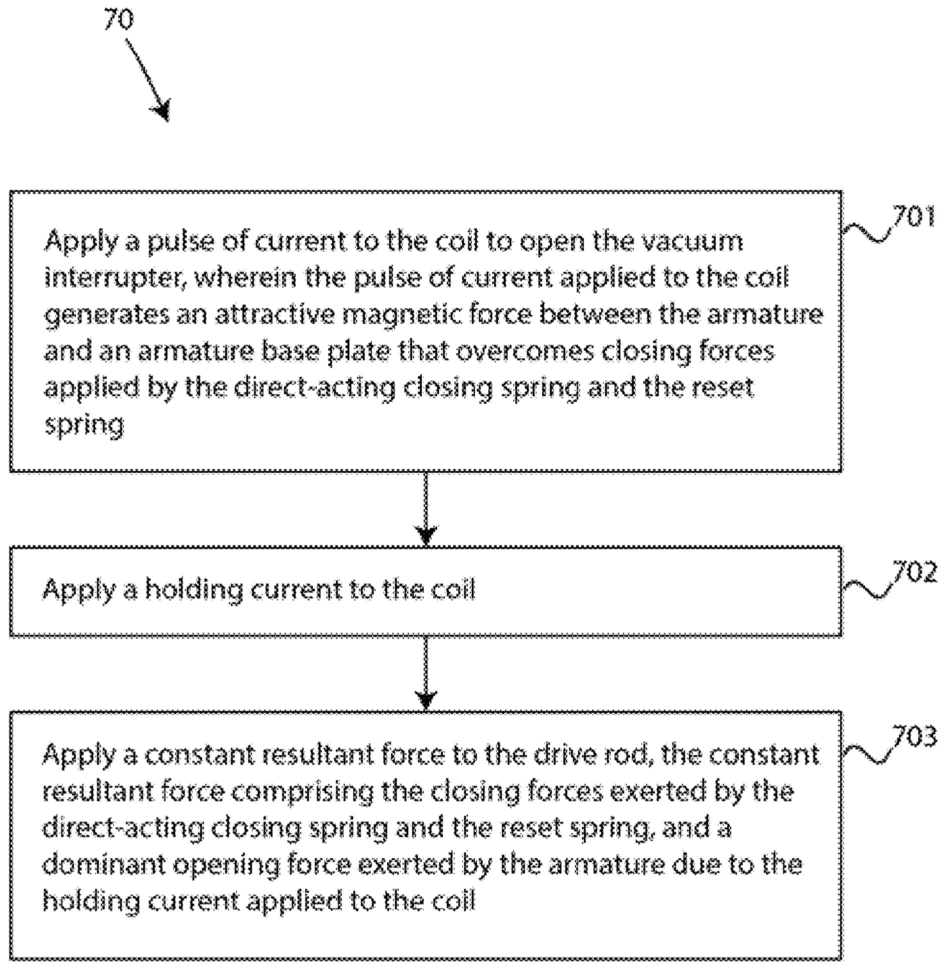
FIG. 7 is a flow diagram illustrating a process of opening a vacuum switched link according to another embodiment.

FIG. 7 is a flow diagram illustrating a process of opening a vacuum switched link according to another embodiment. In some embodiments, process 70 may be performed by VSL 20 of FIGS. 2 and 3. Referring to FIG. 7, at block 701, a pulse of current is applied to the coil to open the vacuum interrupter. The pulse of current applied to the coil generates an attractive magnetic force between the armature and an armature base plate that overcomes closing forces applied by the direct-acting closing spring and the reset spring. At block 702, a holding current is applied to the coil. At block 703, a constant resultant force is applied to the drive rod. The constant resultant force includes the closing forces exerted by the direct-acting closing spring and the reset spring, and a dominant opening force exerted by the armature due to the holding current applied to the coil.

Figure 8:
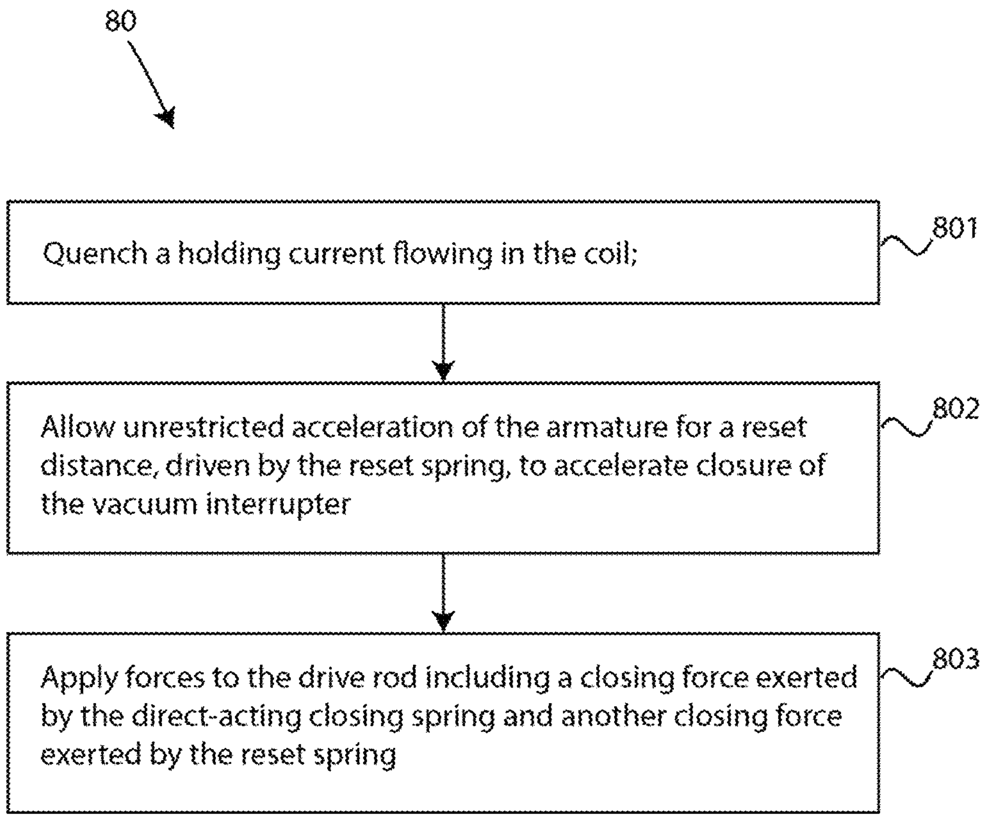
FIG. 8 is a flow diagram illustrating a process of closing a vacuum switched link according to another embodiment.

FIG. 8 is a flow diagram illustrating a process of closing a vacuum switched link according to another embodiment. In some embodiments, process 80 may be performed by VSL 20 of FIGS. 2 and 3. Referring to FIG. 8, at block 801, a holding current flowing in the coil is quenched. At block 802, unrestricted acceleration of the armature is allowed for a reset distance, driven by the reset spring, to accelerate closure of the vacuum interrupter. At block 803, forces are applied to the drive rod including a closing force exerted by the direct-acting closing spring and another closing force exerted by the reset spring.

The teachings contained in the embodiments described herein may be applied to any vacuum interrupter and to any vacuum switched link.

While the disclosure has been described in terms of several embodiments, those of ordinary skill in the art will recognize that the disclosure is not limited to the embodiments described but can be practiced with modification and alteration within the spirit and scope of the appended claims. Advances in technology will also provide for additional ways to practice the embodiments described herein. These are anticipated and covered by the current application. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. An apparatus, comprising:
- a vacuum interrupter comprising a mechanical coupling and a moving contact;
- a drive rod, wherein the mechanical coupling is disposed between the drive rod and the moving contact;
- a direct-acting closing spring coupled to the drive rod;
- a reset spring coupled to the drive rod;
- an armature slidably coupled to the drive rod and responsive to the reset spring during closing of the vacuum interrupter; and
- a coil embedded in the armature;
- wherein:
- contact load of the vacuum interrupter is in a range of 6,000-10,000 newtons; or
- a rated current of the vacuum interrupter is in a range of 1,800-5,400 amperes; or
- when the coil is de-energized, the drive rod is accelerated upward to close the vacuum interrupter, wherein time to close the vacuum interrupter is in a range of 18-22 milliseconds.

2. The apparatus of claim 1 wherein a first portion of the drive rod comprises an insulating material.

3. The apparatus of claim 2 wherein the first portion of the drive rod is coupled to a second portion of the drive rod comprising stainless steel.

4. The apparatus of claim 3 further comprising an anti-rotation disc coupled to the second portion of the drive rod, to reduce effect of torque generated during a linear expansion or contraction of the direct-acting closing spring and the reset spring.

5. The apparatus of claim 1 wherein the vacuum interrupter further comprises a moving contact stem mechanically coupled to a bellows, wherein a portion of a vacuum enclosure of the vacuum interrupter includes the bellows.

6. The apparatus of claim 1 wherein the vacuum interrupter further comprises a fixed contact and a moving contact, the fixed contact being spaced apart from the moving contact by a distance in a range of 4-8 millimeters (mm) when the vacuum interrupter is in an open position.

7. The apparatus of claim 1 wherein the vacuum interrupter remains open when a holding current is applied to the coil.

8. The apparatus of claim 1 further comprising an actuator coupled to the mechanical coupling of the vacuum interrupter, wherein the vacuum interrupter is closed when the actuator is de-energized.

9. The apparatus of claim 1 further comprising an actuator coupled to the mechanical coupling of the vacuum interrupter, wherein the vacuum interrupter is open when the actuator is energized.

10. The apparatus of claim 1 wherein travel of the direct-acting closing spring is same as a closing distance of the vacuum interrupter.

11. The apparatus of claim 1 wherein travel of the reset spring is same as travel of the armature with respect to the drive rod.

12. The apparatus of claim 1 further comprising shock absorbers coupled to the drive rod, to retard closing speed of the vacuum interrupter.

13. The apparatus of claim 1 wherein when the coil is energized, an attractive magnetic force is applied between the armature and an armature base plate to open the vacuum interrupter.

14. The apparatus of claim 13 wherein time to open the vacuum interrupter is in a range of 5-25 milliseconds.

15. A method of opening a vacuum switched link having a vacuum interrupter, a drive rod, a direct-acting closing spring, a reset spring, and an armature having a coil embedded therein, the vacuum interrupter comprising a moving contact coupled to the drive rod, the drive rod further coupled to the direct-acting closing spring and the reset spring, and the armature slidably coupled to the drive rod, the method comprising:

applying a pulse of current to the coil to open the vacuum interrupter, wherein the pulse of current applied to the coil generates an attractive magnetic force between the armature and an armature base plate that overcomes closing forces applied by the direct-acting closing spring and the reset spring;

applying a holding current to the coil; and applying a constant resultant force to the drive rod, the constant resultant force comprising the closing forces exerted by the direct-acting closing spring and the reset spring, and a dominant opening force exerted by the armature due to the holding current applied to the coil;

wherein:

contact load of the vacuum interrupter is in a range of 6,000-10,000 newtons; or a rated current of the vacuum interrupter is in a range of 1,800-5,400 amperes; or when the coil is de-energized, the drive rod is accelerated upward to close the vacuum interrupter, wherein time to close the vacuum interrupter is in a range of 18-22 milliseconds.

16. A method of closing a vacuum switched link having a vacuum interrupter, a drive rod, a direct-acting closing spring, a reset spring, and an armature having a coil embedded therein, the vacuum interrupter comprising a moving contact coupled to the drive rod, the drive rod further coupled to the direct-acting closing spring and the reset spring, and the armature slidably coupled to the drive rod, the method comprising:

quenching a holding current flowing in the coil;

allowing unrestricted acceleration of the armature for a reset distance, driven by the reset spring, to accelerate closure of the vacuum interrupter; and applying forces to the drive rod including a closing force exerted by the direct-acting closing spring and another closing force exerted by the reset spring;

wherein:

contact load of the vacuum interrupter is in a range of 6,000-10,000 newtons; or a rated current of the vacuum interrupter is in a range of 1,800-5,400 amperes; or when the coil is de-energized, the drive rod is accelerated upward to close the vacuum interrupter, wherein time to close the vacuum interrupter is in a range of 18-22 milliseconds.

* * * * *